(12) United States Patent
Bergbach et al.

(10) Patent No.: US 7,034,929 B2
(45) Date of Patent: Apr. 25, 2006

(54) PROTECTIVE APPARATUS FOR THE MONITORING OF A PROTECTED ZONE TO BE MOVED WITH A COMPONENT

(75) Inventors: Roland Bergbach, Emmendingen (DE); Martin Wüstefeld, Sexau (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 10/680,825

(22) Filed: Oct. 7, 2003

(65) Prior Publication Data

US 2004/0070751 A1 Apr. 15, 2004

(30) Foreign Application Priority Data

Oct. 9, 2002 (DE) ................. 102 47 136

(51) Int. Cl.
*G01B 11/26* (2006.01)
*G01C 1/00* (2006.01)
*F16P 3/14* (2006.01)

(52) U.S. Cl. ................... 356/141.3; 100/348
(58) Field of Classification Search ......... 356/141.03; 192/129 A, 130; 100/348; 250/221
See application file for complete search history.

(56) References Cited

U.S. PATENT DOCUMENTS

| 6,316,763 | B1 | 11/2001 | Appleyard et al. |
| 6,677,574 | B1 * | 1/2004 | Fiessler ...................... 250/221 |
| 6,752,253 | B1 * | 6/2004 | Fiessler ...................... 192/130 |
| 2003/0010137 | A1 * | 1/2003 | Dalton et al. .......... 73/862.324 |

FOREIGN PATENT DOCUMENTS

| DE | 913 013 | 6/1954 |
| DE | 927 246 | 5/1955 |
| DE | 11 70 286 | 5/1964 |
| DE | 1 566 730 | 7/1971 |
| DE | 296 08 139 | 8/1996 |
| DE | 199 24 470 | 9/2000 |
| DE | 100 27 156 | 12/2001 |
| DE | 101 14 784 | 10/2002 |
| EP | 0 083 431 A1 | 7/1983 |
| EP | 1246148 A2 * | 10/2002 |

OTHER PUBLICATIONS

Search Report and English Translation for German Patent Application No. 102 47 136.3.
European Search Report re: Application No. EP 03 018 853.6 dated Dec. 28, 2004 with English translation.

* cited by examiner

*Primary Examiner*—Thomas H. Tarcza
*Assistant Examiner*—Isam Alsomiri
(74) *Attorney, Agent, or Firm*—Harness, Dickey & Pierce (57) ABSTRACT

A protective device for securing to a component movable along a track and for the monitoring of a protected zone moving with the component includes a light transmitter for the radiation of a divergent transmitted light beam into a spatial zone containing the protected zone, a light receiver for the reception of at least some of the light of the transmitted light beam of the light transmitter radiated into the spatial zone and for the emitting of corresponding received signals, and a restriction device which is arranged in the direction of a transmitted light path after a section of the transmitted light path which contains the protected zone and by means of which the transmitted light beam can be restricted to a less divergent received light beam defining the width of the protected zone in at least one direction.

23 Claims, 6 Drawing Sheets

PROTECTIVE APPARATUS FOR THE MONITORING OF A PROTECTED ZONE TO BE MOVED WITH A COMPONENT

CROSS-REFERENCE TO RELATED APPLICATIONS

This application claims priority to German Patent Application No. 102 47 136.3 filed Oct. 9, 2003, which application is herein expressly incorporated by reference.

FIELD OF THE INVENTION

The present invention relates to a protective apparatus for securing to a component movable along a track and for the monitoring of a protected zone to be moved with the component as well as to a method for the monitoring of a protected zone which has to be moved together with a component moved along a path.

BACKGROUND OF THE INVENTION

Machines are used in many areas which have components moved automatically by a drive device or which are moved themselves. If persons are standing in the movement zone of these components, the persons can be potentially at risk from the movement of the components. For the protection of people, protective apparatuses can therefore be arranged at the moved component at such machines which allow a monitoring of a protected zone moved along with the component. If the presence of a person is detected in the moved along protected zone, the movement of the component can be interrupted.

Figure 1:
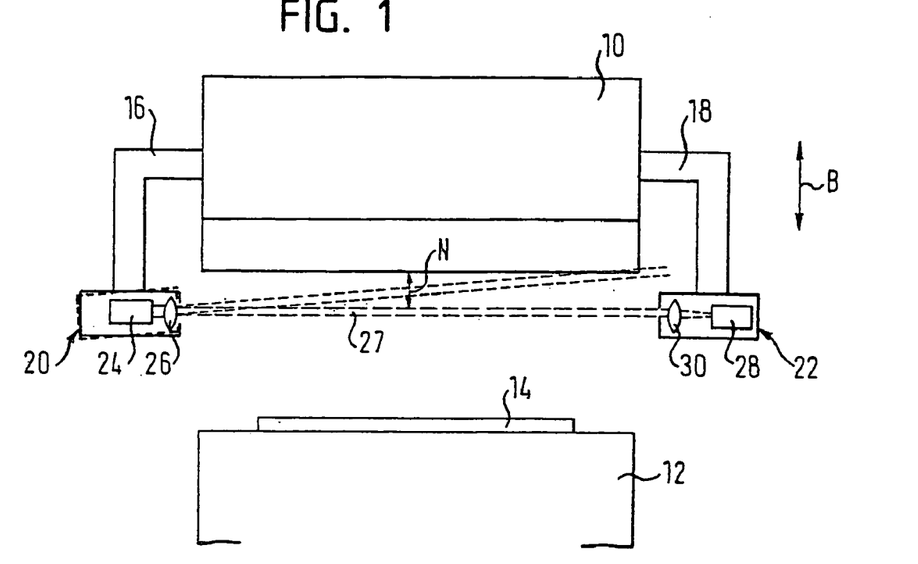
FIG. 1 is a schematic, partly side view of a bending press with a conventional protective apparatus.

An example for such a machine is a bending press which is shown schematically in part in FIG. 1 and which has a bending tool 10 driven by a drive device not shown in FIG. 1 and having, for example, a lower side formed in a V shape and a stationary lower tool 12 whose upper side can, for example, have a V groove corresponding to the shape of the lower side of the bending tool 10. For the shaping of a workpiece 14, it is placed by an operator onto the lower tool 12. To achieve a short cycle time, the bending tool 10 is moved from a starting position at high speed along a direction of movement B toward the workpiece 14, but is then braked again such that it impacts the workpiece 14 at a lower speed suitable for the bending process and presses said workpiece into the lower tool 12. The slowing down of the movement of the bending tool 10 can not take place instantaneously due, among other things, to its inertia. The path which is necessary to brake the bending tool 10 down from the fast speed to a standstill is also termed the trailing path N.

For the protection of a person who places workpieces 14 into the bending press, a light transmitter 20 and a light receiver 22 are attached to two holding arms 16 and 18 and together form a one-way light barrier. The light transmitter 20, which has a light source 24 and a focusing optical transmitting system 26, radiates a substantially parallel transmitted light beam 27 at a distance to the trailing path N parallel to the lower side of the bending tool 10 onto the light receiver 22 which has a photo-detection element with evaluation electronics 28 and an optical reception system 30 for the focusing of the received light ray onto the photo-detection element 28 with the evaluation electronics. The evaluation electronics are made such that, when the light path between the light transmitter 20 and the light receiver 22 is interrupted, a signal can be emitted to the drive device so that it brakes the movement of the bending tool 10 as fast as possible. The parallel transmitted light beam emitted by the light transmitter 20 therefore defines a protected zone which prevents injury to a person thanks to its distance from the lower side of the bending tool 10 corresponding to the size of the trailing path N.

In practice, however, vibrations of the holding arms 16 and 18 occur due to the movement of the bending tool 10, whereby the light transmitter 20, and thus also the parallel transmitted light beam 27 emitted by the light transmitter, is, for example, tilted relative to the light transmitter 20 (illustrated in FIG. 1 by short-dotted lines). Due to the long light path, even small angles of tilt can result in large movements of the transmitted light beam 27 in the plane of the light receiver 22, and in particular in a migration from a reception surface of the light receiver 22. The transmitted light beam 27 can thereby no longer be received by the light transmitter 22 even without the presence of a body part of a person between the bending tool 10 and the workpiece 14. The evaluation optics will therefore detect an interruption of the light path such that the bending press is stopped. This increases the downtimes of the bending press in an unnecessary manner.

To reduce the downtime, a reception surface of the light receiver 22 can alternatively be enlarged such that the transmitted light ray 27 of the light transmitter 20 does not migrate so easily from the light receiver 22 on vibrations. However, the case can then occur that the presence of a body part of a person between the bending tool 10 and the workpiece 14—in FIG. 1, for example, close to the light receiver 22—cannot be detected although it is at a distance beneath the bending tool 10 inside the trailing path N. This then means a reduction in labor safety.

Bending presses secured in this manner therefore have the disadvantage that they either conceal increased safety risks for the operators or have undesirably high downtimes.

SUMMARY OF THE INVENTION

It is therefore the underlying object of the present invention to provide a protective apparatus for securing to a component movable along a track and for the monitoring of a protected zone to be moved with the component, which has good functional reliability, as well as a method for the monitoring of a protected zone which has to be moved along with a component moved along a track.

The object is satisfied by a protective apparatus having the features of claim 1.

The protective apparatus in accordance with the invention for securing to a component movable along a track and for the monitoring of a protected zone to be moved with the component includes a light transmitter for the radiation of a divergent transmitted light beam into a spatial zone containing the protected zone, a light receiver for the reception of at least some of the light of the transmitted light beam of the light transmitter radiated into the spatial zone and for the emitting of corresponding received signals and a restriction device which is arranged after a section of the transmitted light path, which contains the protected zone in the direction of a transmitted light path and by means of which the transmitted light beam can be restricted to a less divergent received light beam defining the width of the protected zone in at least one direction.

The object is furthermore satisfied by a method for the monitoring of a protected zone having the features of claim 21.

In the method in accordance with the invention for the monitoring of a protected zone which has to be moved along with a component moved along a track, a divergent transmitted light beam is transmitted and moved along with the component, the divergent transmitted light beam is restricted after covering a light path including the protected zone to a less divergent received light beam moved along with the component and defining the width of the protected zone in at least one direction and the received light beam is received and monitored.

The component along with which the protected zone is to be moved can principally be any desired component movable along a path, preferably along a fixedly pre-determined path, and in particular movable by an at least semi-automatic drive.

The protective apparatus in accordance with the invention is provided for securing to this component for the moving along of the protected zone.

In accordance with the invention, a divergent transmitted light beam is transmitted and moved along with the component. For this purpose, the light transmitter is provided for the radiation of the divergent transmitted light beam into a spatial zone containing the protected zone such that both this spatial zone and the transmitted light beam can be moved along with the component. The light transmitter can include a light source for example for light in the visible or in the infrared wavelength of light and, optionally, an optical transmitter system for the shaping of the divergent transmitted light beam from light emitted by the light source. The transmitted light beam is divergent in at least one direction of divergence, i.e. in particular in a sectional plane through the transmitted light beam along a direction of propagation of the light.

The restriction of the transmitted light beam in accordance with the invention takes place in the protective apparatus in accordance with the invention by the restriction device which is arranged such that the transmitted light beam is restricted at the earliest after covering a path containing the protected zone in the direction of divergence of the transmitted light beam. The restriction device can therefore also be moved along with the component and can in particular be held at it.

A part beam of the light of the divergent transmitted light beam determined by the restriction device is furthermore received and monitored after the restriction as a received light beam moved along with the component. In the apparatus in accordance with the invention, the light receiver serves for this purpose which is to be secured to the component, can then be moved along with the component and can, for this purpose, have a photo-detection element for light of the light transmitter and, optionally, an optical reception system for focusing the received light beam onto the photo-detection element.

The transmitted light beam, which is divergent contrary to the prior art, does not define the protected zone, but only contains it, in accordance with the invention.

The definition of the protected zone rather takes place in that the divergent transmitted light beam is restricted after covering the light path including the protected zone to a less divergent received light beam determining the width of the protected zone in at least one direction. The received light beam can in particular also be parallel or even convergent. The term of the less divergent received light beam therefore includes these two alternatives in the sense of the present invention. A narrower, that is less divergent, part beam is therefore so-to-say cut out of the divergent, i.e. spread out, transmitted light beam by the restriction, said part beam defining the protected zone and being received and monitored after the restriction or after the restriction device as a received light beam moved along with the component. Only the blocking of the part beam, and thus of the corresponding received light beam, is therefore monitored such that it, and in particular its width, in one direction or the part beam and its corresponding width define the protected zone. The restriction device therefore determines the part beam of the transmitted light beam between the light transmitter and the restriction device which can be received by the light receiver as the received light beam and thus defines the protected zone.

On a movement of the transmitted light beam by vibrations in a direction in which the transmitted light beam is divergent and in which a restriction takes place, only one other part beam of the transmitted light beam is used as the received light beam. The position of the protected zone, however, remains the same, since the received light beam or the restriction device are moved along with the component and a vibration-determined movement of the restriction device or of the light receiver only results in small displacements of the protected zone, but not in pivot movements with some large deflections of the part beam.

The protected zone can therefore also be held in a constant position relative to the component on a vibration of the light transmitter by a suitable arrangement of the restriction device.

A transmitted light beam is expediently used which is divergent at least in a direction tangential to the track of the component, for which purpose the light transmitter has to be aligned correspondingly. The restriction then takes place in the same direction, which can take place by a corresponding arrangement of the restriction device. The protected zone can be moved along in front of the component in this manner.

A migration of the transmitted light beam from the light receiver is thus largely avoided such that an interruption of the light path caused by a relative movement of the light transmitter and of the light receiver and an incorrect report of an infringement of the protected zone which thus takes place and which can, for example, result in a braking of the component is avoided.

A particularly large functional reliability of the protective apparatus in accordance with the invention thus also results on vibrations of the component to which the protection device is secured.

The use of a divergent transmitted light beam furthermore allows a particularly simple adjustment of the light transmitter relative to the restriction device or to the light receiver since, on a tilting of the light transmitter relative to the light receiver, only a different part beam of the transmitted light beam can be received as the received light beam.

Further developments and preferred embodiments of the invention are described in the description, in the claims and in the drawings.

An aperture angle of the transmitted light beam which determines the divergence of the transmitted light beam in the direction of divergence can preferably be selected, among other things, in dependence on the spacing between the light transmitter and the restriction device, since this spacing, together with the aperture angle, forms the width of the transmitted light beam at the restriction device. It is preferred for an aperture angle of the transmitted light beam to be selected such that a width of the transmitted light beam in a pre-determined direction orthogonal to the transmitted light path directly in front of the restriction device is larger by a factor of 10 than a corresponding width of the received light beam directly at the restriction device. (See FIG. 2A where a>10b.) Such a large divergence of the transmitted light beam relative to that of the received light beam allows a particularly simple adjustment and a high functional reliability, in particular if the pre-determined direction is arranged tangentially to the track of the component after the fitting to the component.

When the aperture angle of the transmitted light beam is pre-determined independently of the special features of the component, and in particular of its movement, a comparatively large amount of light of the light transmitter can remain unused during the total operation due to the divergence of the transmitted light beam. It is therefore preferred for an aperture angle of the transmitted light beam to be selected such that a width of the transmitted light beam directly at the restriction device is larger in a pre-determined direction orthogonal to the transmitted light path than a mean movement amplitude of the transmitted light beam to be expected caused by a relative movement of the light transmitter and the restriction direction directly at the restriction device. (See FIG. 2B where a>c.) In this manner, with a given functional reliability, as much light as possible of the light transmitter is also actually used for the monitoring of the protected zone on the operation of the protective apparatus.

The restriction device can generally include any desired means by means of which the divergent transmitted light beam can be restricted in its width to the received light beam in the pre-determined direction. It can, for example, be a restriction of the light-sensitive surface of the photo-detection element. It is, however, preferred for the restriction device to include a diaphragm. Such a restriction device is in particular suitable for use in one-way light barriers, i.e. for the case that the light transmitter and the light receiver are arranged on opposing sides of the protected zone. The protected zone can be defined very easily by the shape and size of the diaphragm restricting the transmitted light beam. The diaphragm can in particular also be made as a part of the light receiver.

It is furthermore preferred for a reflecting element to be used for the restriction of the transmitted light beam. In particular, it is preferred in the protective device in accordance with the invention for the restriction device to include a reflecting element at which a part beam of the divergent transmitted light beam to be supplied to the light receiver can be reflected. The reflecting element acting in a reflecting manner for light of the light transmitter thus acts in a similar manner to a diaphragm in that only light of the transmitted light beam incident onto the surface of the reflecting element is reflected as the received light beam. The size, shape and alignment of the reflecting surface, which is preferably surrounded by a region reflecting the light of the light transmitter not at all or only a little, determine the width or divergence of the received light beam and the direction in which the transmitted light beam is restricted. Furthermore, it simultaneously allows a deflection of the light path.

In another embodiment of the invention, it is preferred for a retro-reflective element to be used for the restriction of the transmitted light beam. For this purpose, it is preferred in the protective apparatus in accordance with the invention for the restriction device to include a retro-reflective element at which a part beam of the divergent transmitted light beam to be supplied to the light receiver can be reflected. A retro-reflective element is here understood as an element which reflects back the incident light again in the direction of the incident light. The retro-reflective element can in particular be a 90° prism, a triple reflector or appropriate reflection foils. Even when the retro-reflective element is tilted with respect to the light transmitter, light can thus again be reflected back in the direction of the light transmitter. Analogously to the case of the reflecting element of a restriction device, the size, shape and alignment of the retro-reflective element or of its optically effective surface also determine the effect on the transmitted light beam here. The resulting received light beam can in particular be convergent.

In the two aforesaid alternatives, it is particularly preferred for the light transmitter and the light receiver to be arranged on the same side of the protected zone. The protective apparatus therefore then includes a special reflection light barrier in which the light transmitter and the light receiver can preferably be arranged in one housing. The arrangement of the light transmitter and the light receiver on the same side of the protected zone in particular allows a particularly simple adjustment of the light transmitter and of the light receiver even before the mounting to the component.

In this case, it is furthermore particularly preferred for the light transmitter and the light receiver to have a common beam splitter and a common transmission/reception lens arranged after the beam splitter at least in the transmission direction. The beam splitter, which can in particular include a semi-transmitting mirror, allows a spatially separated arrangement of a light source of the light transmitter and of a photo-detection element of the light receiver, although the transmitted light beam and the received light beam overlap at least in the region of the transmission/reception lens. In this manner, an optical transmission system and an optical reception system of the protective apparatus in accordance with the invention are at least partly integrated, which results, in particular in conjunction with a retro-reflective element as the restriction device, in a simple design with a simultaneously high accuracy of the beam guiding.

It is furthermore preferred for the light receiver to have at least one reception element whose reception surface has a greater extent in a divergence direction of the received light beam which corresponds to the direction in which the divergent transmitted light beam has been restricted by the restriction device than in a direction orthogonally thereto. This reception element can in particular be a photo-detection element. As previously mentioned in connection with the term of the less divergent reception light beam, the received light beam does not necessarily have to be divergent in the direction of divergence, but can also be parallel or convergent. In this manner, a migration of the received light beam from a reception surface of the reception element, which is caused by a tilting of the light transmitter and/or of the light receiver or of the restriction device with a reflecting or retro-reflective element, can be avoided at least with small tilting angles. The extent of the reception element in the direction of divergence of the received light beam is particularly preferably larger by a factor of at least 4 than its extent in a direction orthogonal thereto.

To achieve a particularly high light intensity on a photo-detection element of the light receiver, the light transmitter preferably has an optical transmission system and/or the light receiver preferably has an optical reception system. To obtain an increased depth of field, it is then preferred for the light receiver to have a slit diaphragm whose slit is arranged parallel to a direction of divergence of the received light beam which corresponds to the direction in which the divergent transmitted light beam can be restricted by the restriction device. The slit is aligned parallel to the direction of divergence of the received light beam at the location of the slit; this means that the direction of divergence is defined with respect to the direction of the received light beam. An increased depth of field is thus achieved in the direction of divergence of the received light beam, but not in a direction orthogonal thereto, which is in particular not necessary when asymmetric reception elements are used. The accuracy requirements for the adjustment of the diaphragm or of the light receiver in the direction of the slit as well as the accuracy requirement on production are hereby reduced.

In accordance with the invention, the transmitted light beam only needs to be divergent in a direction which is preferably aligned tangentially to the track along which the component is moved. A very narrow, i.e. almost linear, protected zone, can then result. It is, however, desirable for many applications for an a real protected zone to be monitored. It is therefore preferred for the light transmitter to be designed such that a transmitted light beam can be emitted by it which diverges to a different extent in two directions orthogonal to one another. Whereas, for example, an aperture angle selected in accordance with the aforesaid criteria can be provided in a direction in which the restriction device restricts the divergent transmitted light beam, the transmitted light beam can, for example, be selected to substantially diverge less in a direction orthogonal thereto such that an areal protected zone results whose surface normal is preferably tangential to the track of the component.

It is therefore particularly preferred for the light transmitter and the restriction device to be made for the monitoring of a substantially areal protected zone in a direction orthogonal to a direction of movement of the component. The restriction device can in particular have a greater extent transversely to the direction in which it restricts the transmitted light beam than in the direction orthogonal thereto.

It is then furthermore preferred for the light receiver to have a diaphragm with a butterfly-shaped diaphragm aperture which includes two wing regions which are arranged transversely to the direction in which the divergent transmitted light beam can be restricted by the restriction device. A minimum width of the diaphragm aperture is particularly preferably approximately as large as the extent of a reflecting or retro-reflective element of the restriction device in the direction in which the restriction device restricts the divergent transmitted light beam. In this manner, a maladjustment between the restriction device and the sensor in the direction of restriction, in which the restriction device restricts the divergent transmitted light beam, can be recognized easily, on the one hand, since the received light beam can no longer pass through the diaphragm aperture on a sufficiently large maladjustment. The position of the protected zone can therefore be kept constant relative to the component in the direction of restriction. On the other hand, however, there is an adjustment tolerance with respect to an inclination of the restriction device transversely to the direction of restriction, since the diaphragm aperture widens toward the outside such that a tilting of the protected zone around the beam direction by correspondingly small angles does not result in an interruption of the received light beam. Furthermore, rotational vibrations of the restriction device which bring about a corresponding inclination do not have a strong effect. Since the marginal region of the protected zone has the function of recognizing an intervention approaching from the side, the difference in the spacing of the protective field from the component which can occur under certain circumstances in the direction of restriction is of less importance.

It is then furthermore particularly preferred for the restriction device to include at least two reflecting or retro-reflective elements which represent an encoding. In this manner, a lateral resolution of the protected zone into zones is also possible.

It is furthermore preferred for the reflecting or retro-reflective elements to be inclined with respect to one another such that a drop in intensity of the transmission and/or reception light beam in the direction of a margin of the light beam can substantially be compensated. A uniformly illuminated protected zone thus results for the light receiver. Typically, zones of retro-reflective elements are tilted in the image central region by an angle different from beams incident on them perpendicularly. The magnitude of the tilt of the retro-reflective elements decreases down to zero toward the image margin. Due to the efficiency of the retro-reflection decreasing as the angle of tilt increases, the imaged energy in the image central region can be reduced and the intensity drop toward the image margin typical for images can be compensated. When retro-reflective elements are used, in particular the retro-reflective elements lying in the center of the transmitted light beam can therefore be tilted by a small angle with respect to the retro-reflective elements lying at the margin of the transmitted light beam such that the corresponding received light beam—in contrast to a received light beam of a retro-reflective element at the margin of the transmitted light beam—is only partially incident on the light receiver or on a corresponding light-sensitive element.

It is in particular preferred for the monitoring of an areal protected zone for the light receiver to have a linear arrangement of photo-detection elements. In this manner, in particular in conjunction with a restriction device having an encoded reflector unit, a resolution is also made possible in a direction perpendicular to the track of the component.

The protective apparatus in accordance with the invention preferably has an evaluation circuit for the reception of received signals of the light receiver and for the emitting of corresponding monitoring signals. In particular a drive for the moved component can then in particular be controlled using these monitoring signals.

A further subject of the invention is a component for an apparatus which can be moved on a pre-determined track with a drive device of the apparatus and which is characterized in that a protective apparatus in accordance with the invention is held at the component, with the protected zone including at least some of the track. The protective apparatus is particularly preferably held at the component such that the transmitted light beam diverges in a direction tangential to the track of the component and such that the restriction device likewise restricts the divergent transmitted light beam in a direction substantially tangential to the track. Vibration influences in the direction of the track can thereby be largely suppressed, in particular without any limitation in safety, such that only a few or no infringements of the protected zone caused only by vibrations are recognized with high reliability. Lower downtimes thus result.

It is preferred for the light transmitter and the restriction device to be held at two holding arms spaced apart spatially transversely to the track of the component. In this manner, a protected zone can be obtained very easily over the total width of the component.

A further subject of the invention is a shaping apparatus, in particular a bending press, having a component in accordance with the invention made as a shaping tool, in particular as a bending tool, with a protective apparatus in accordance with the invention, with the protected zone including at least some of the track. Large advantages in particular result for such apparatuses, since high safety demands are made, on the one hand, due to the high forces and high tool speeds which occur as a rule in shaping, and since only low downtimes are desired at the same time. The use of the protective apparatus in accordance with the invention therefore allows a particularly safe and efficient manner of operation of the shaping apparatus in accordance with the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 2:
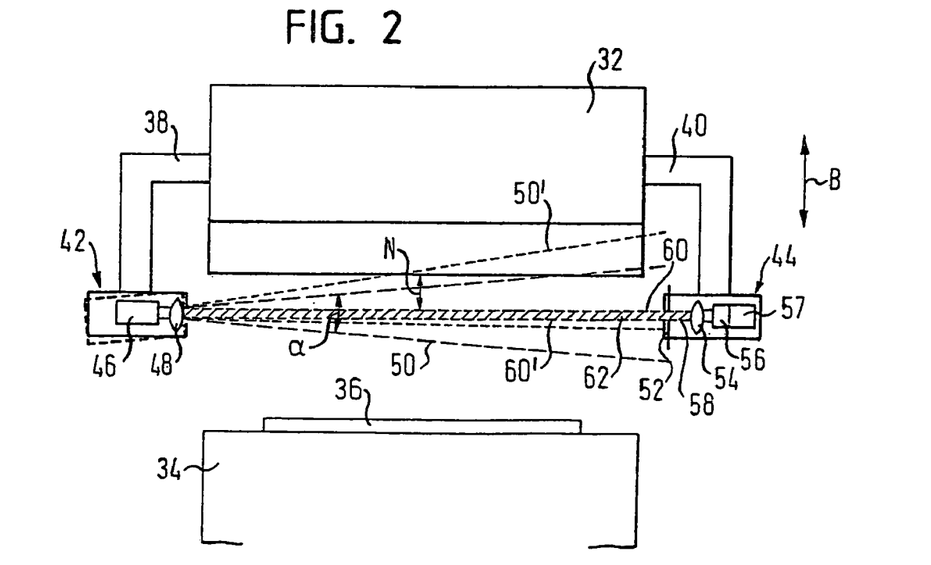
FIG. 2 is a schematic, partly side view of a bending prees with a protective apparatus in accordance with a first preferred embodiment of the invention, and FIGS. 2A and 2B contain labeled dimensions of features shown in FIG. 2.
Figure 2A:
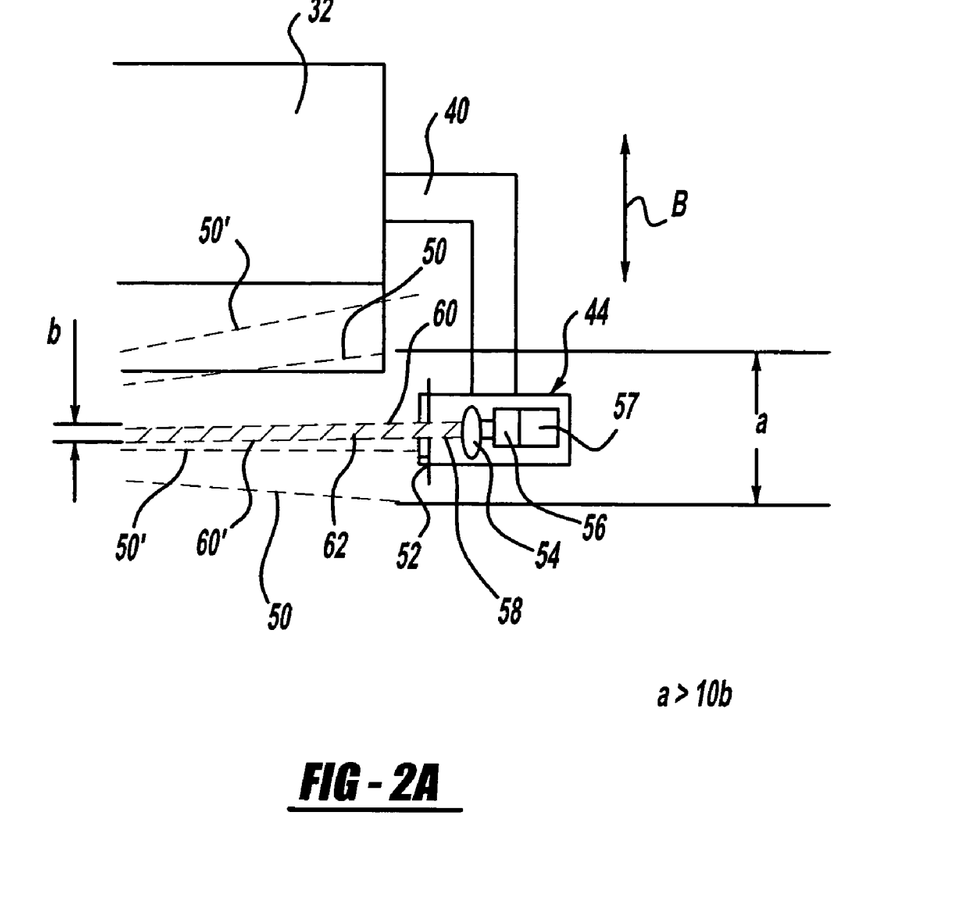
Figure 2B:
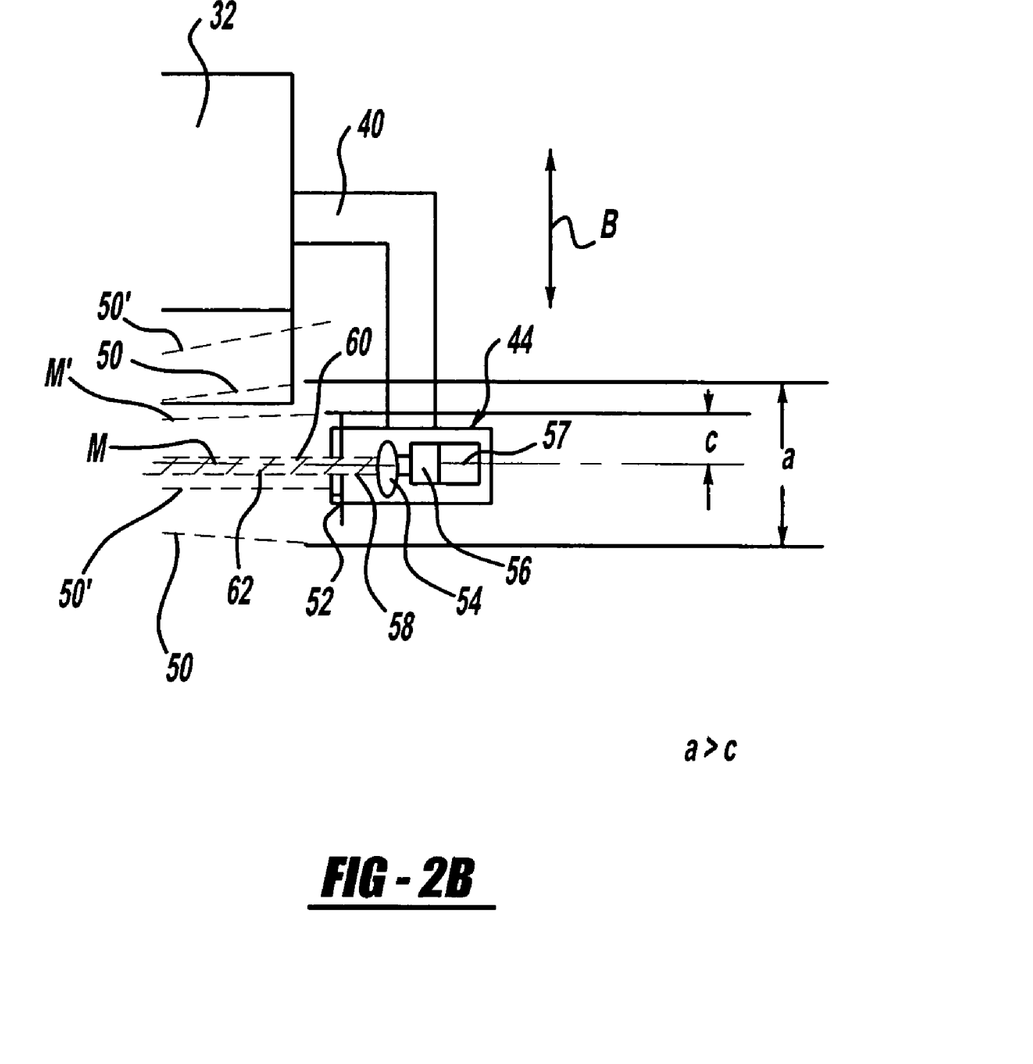

In FIG. 2, a bending press includes a bending tool 32, which can be moved in a direction of movement B along a pre-determined linear path by a drive device not shown in FIG. 2, and a stationary lower tool 34, on which a workpiece 36 can be stored for working.

The bending tool 32 has a V-shaped lower side. The upper side of the lower tool 34 is made complementary to this lower side of the bending tool 32 and has a corresponding V-shaped bending groove which is not shown in FIG. 2.

A protective apparatus of the invention in accordance with a first embodiment of the invention is held at holding arms 38 and 40 secured to the bending tool. It includes a light transmitter 42 held at the holding arm 38 and a light receiver 44 held at the holding arm 40 and connected to the drive device of the bending press by a lead (not shown).

The light transmitter 42 includes—in a housing—a light source 46 in the form of a red light LED or an infrared light LED and an optical transmission system 48 arranged in front of the light source 46 in the radiation direction.

The optical transmission system 48 includes at least one lens and is designed such that light of the LED 46 can be radiated as a transmitted light beam 50 which is divergent in a direction parallel to the direction of movement B of the bending tool 32.

Furthermore, the light transmitter 42 is held at the holding arm 38 such that the divergent transmitted light beam 50 can be radiated in a direction substantially along the lower side of the bending tool 32 and parallel thereto. A light discharge aperture of the light transmitter 42 has a spacing from a lower edge of the bending tool 32 of the magnitude of a trailing path N, which is defined as above, such that the transmitted light beam 50 also has this spacing from the lower edge of the bending tool 32 on average.

The light receiver 44 includes—in a housing—a diaphragm 52 as a restriction device, an optical reception system 54, a photo-detection element 56 for the reception of red light or of infrared light of the light transmitter 42 and for the emitting of corresponding received signals and an evaluation circuit 57 connected to the photo-detection element 56 for the monitoring of the received signals and for the emitting of monitoring signals to the drive device.

For the monitoring of a protected zone beneath the bending tool 32, infrared light is emitted by the light emitting diode 46 during a movement of the bending tool 32 and shaped by the optical transmission system 48 into the transmitted light beam 50 which is divergent in a direction parallel to the direction of movement B of the bending tool 32. The transmitted light beam 50 passes through a corresponding spatial zone moved beneath the bending tool 32 along with the bending tool and is restricted by the diaphragm 52 acting as a restriction device to a received light beam 58 which is substantially less divergent than the transmitted light beam 50. The received light beam 58 is then focused onto the photo-detection element 56 by the optical reception system 54. The photo-detection element 56 receives the infrared light and converts it into an electrical signal which is monitored by the evaluation circuit 57. The evaluation circuit 57 emits an alarm signal to the drive device for the bending tool 32 on the absence of a received signal such that the bending tool's movement is stopped.

The diaphragm 52 therefore only allows a part beam 60 of the transmitted light beam 58 to pass which is supplied to the photo-detection element 56 as a received light beam 58 via the optical reception system 54. Only if an object blocks the part beam 60 of the divergent transmitted light beam 50 can no light be received by the light receiver 44 such that the part beam 60 defined by a diaphragm aperture of the diaphragm 52 forms a protected zone 62 of the protective apparatus formed by the light transmitter 42 and by the light receiver 44 shown as hatched.

As can easily be recognized in FIG. 2, a tilting of the light transmitter 42 admittedly results in a correspondingly pivoted divergent transmitted light beam 50' but another part beam 60' of the divergent transmitted light beam 50' is now transmitted through the diaphragm 52 as the restriction device and has the same position and the same width relative to the bending tool 32 as the part beam 60. The position of the protected zone 62 relative to the bending tool 32 therefore remains substantially unchanged even on a movement of the light transmitter 42. A movement of the light receiver 44 also does not substantially change the position of the protected zone 62 relative to the bending tool 32 since, in contrast to movements of the light transmitter 42, small movements of the light receiver 42, and thus of the restriction device in the form of the diaphragm 52, do not result in a pivoting of the part beam 60, but at most in small displacements.

To achieve a sufficient insensitivity to the influence of vibrations, an aperture angle α of the divergent transmitted light beam 50 amounts, for example, to approximately 1° with a 2 m long bending tool, with the diaphragm 52 then being able to have a diaphragm aperture with a width of, for example, approximately 5 mm in the direction of restriction parallel to the direction of movement B such that the width of the transmitted light beam 50 at the diaphragm 52 amounts to approximately 3.5 cm. The angles and lengths used in the Figures are, if not otherwise stated, only selected for a better illustration and are therefore not necessarily realistic.

To allow a stopping of the bending tool 32 in good time, the light transmitter 42 and the light receiver 44 are held at the holding arms 38 or 40 such that the protected zone 62 extends substantially parallel to the lower edge of the bending tool 32 at a spacing from the trailing path N which designates the path which is required to brake the bending tool 32 down to a standstill as quickly as maximally possible.

Figure 3:
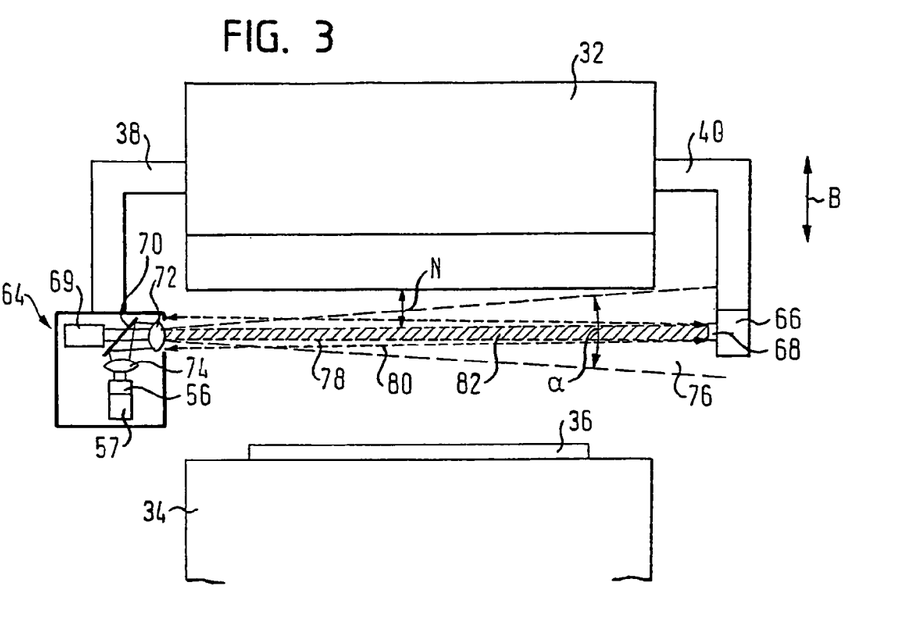
FIG. 3 is a schematic, partly side view of a bending press with a protective apparatus in accordance with a second preferred embodiment of the invention.

In FIG. 3, a bending press is shown with a protective apparatus in accordance with a second preferred embodiment of the invention which only differs from the first embodiment by the design of the protective apparatus. The same statements therefore apply with respect to the same components, in particular to the bending press, as in the preceding embodiment and the same reference numerals are used.

The protective apparatus now includes a light transmitter and a light receiver which are combined to from one transmission/reception unit 64 and are held at the holding arm 38. A restriction device in the form of a reflecting element 68 is arranged at a holder 66 at the holding arm 40.

The transmission/reception unit 64 includes as a light source for the light transmitter a laser diode 69 for red light, a beam splitter 70 and an optical transmission/reception system 72 and for the light receiver, in addition to the optical transmission/reception system 72 and the beam splitter 70, a further optical reception system 74, a photo-detection element 56 and an evaluation circuit 57. The photo-detection element 56 and the evaluation circuit 57 are made as in the preceding embodiment.

The beam splitter 70 is formed by a semi-transmitting mirror.

The reflecting element 68 is formed by a mirror reflective for light of the laser diode 69, whereas the holder 66 does not reflect the light at all or only weakly.

For the monitoring light of the laser diode 69 is shaped by the beam splitter 70 and by the optical transmission/reception system 72 to a divergent transmitted light beam 76 which is radiated between the bending tool 32 and the lower tool 34 and which is divergent in a direction parallel to the direction of movement B of the bending tool 32.

The transmitted light beam 76 is then incident on the reflecting element 68 and on the holder 66, with it substantially only being reflected at the reflecting element 68. A part beam 78 of the transmitted light beam 76 is therefore reflected back to the transmission/reception unit 64 as a received light beam 80. The width of the part beam 78 and that of the received light beam 80 are defined by the extent of the reflecting element 68 parallel to the track of the bending tool 32, i.e. to the direction of movement B in the example. The reflecting element 68 therefore represents a restriction device within the sense of the invention.

The received light beam 80 is focused or deflected onto the photo-detection element 56 by the optical transmission/reception system 72, by the beam splitter 70 and by the further optical reception system 74.

Analog to the part beam 60 of the transmitted light beam 50 in the preceding embodiment, a protected zone 82 is now substantially provided by the part beam 78 since only its blocking results in a change of the received light beam 80 received by the transmission/reception unit 64.

The reflecting element 68 and the transmission/reception unit 64 are in turn arranged such that the protected zone 82 is arranged substantially parallel to the lower side of the bending tool 32 at a spacing from the trailing path N.

To obtain high function reliability, the optical transmission/reception system 72 is made such that an aperture angle α of the transmitted light beam 76 is so large that its width in a plane parallel to the reflecting element 68 is approximately ten times larger directly at the reflecting element 68 than the extent of the reflecting element 68 in this direction. The widths of the part beam 78 and of the received light beam 80 directly at the reflecting element are therefore—defined by the corresponding extent of the reflecting element—smaller by a factor of approximately 10 than the width of the transmitted light beam 76 at this point.

The function of the protective apparatus of the second embodiment, and in particular also the insensitivity to vibrations, result analogously to that of the first embodiment.

A bending press with a protective apparatus in accordance with a third preferred embodiment of the invention is partly shown in FIGS. 4 to 7. It differs from the bending press in the second embodiment by the design of the restriction device and by the design of the transmission/reception unit. The same reference numerals are therefore used for the same components and the statements on these components also apply accordingly in this embodiment.

Figure 4:
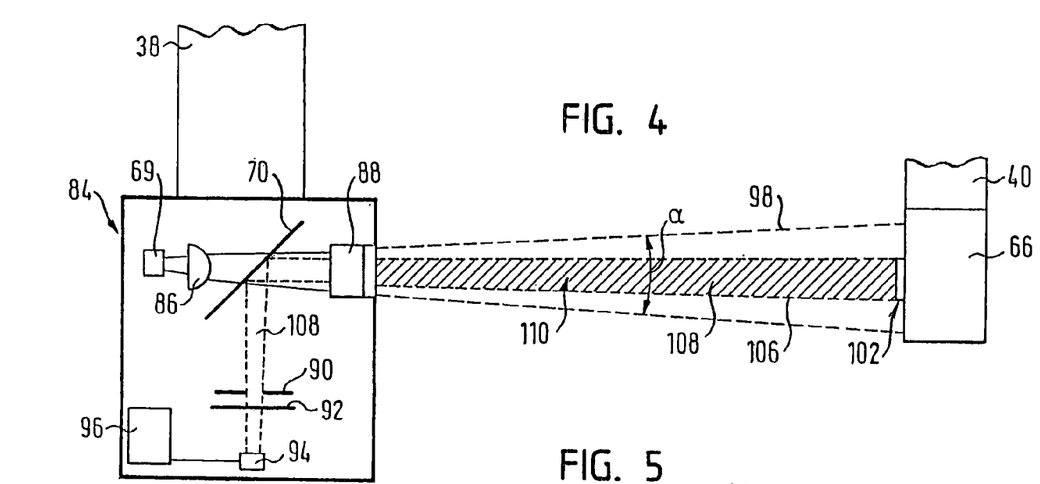
FIG. 4 is a schematic, partly side view of two holding arms with a protective apparatus of a bending press in accordance with a third preferred embodiment of the invention.

A transmission/reception unit 84 which includes a light transmitter and a light receiver and is held at the arm 38 has a laser diode 69 for red light, a cylindrical lens 86, a beam splitter 70, an aspheric lens 88, a slit diaphragm 90, a color filter 92 and a line-scan camera 94 which is connected to an evaluation circuit 96.

The cylindrical lens 86 and the aspheric lens 88 are made and arranged such that light of the laser diode 69 is shaped to form a transmitted beam 98 which is divergent in two directions orthogonal to one another and has an aperture angle α parallel to the direction of movement B of the bending tool 32 which is smaller than a further aperture angle α' in a direction orthognal of movement B.

The aspheric lens 88 is furthermore designed such that received light is focused onto the line-scan camera 94 through the slit diaphragm 90 and the color filter 92 after reflection at the beam splitter 70.

The slit diaphragm 90 has a slit 99 which is arranged in a plane through the holding arms 38 and 40 perpendicular to the direction of movement B.

The color filter 92, which includes an interference filter, serves for the elimination of outside light or interfering light and substantially only transmits light of the laser diode 69.

Figure 7:
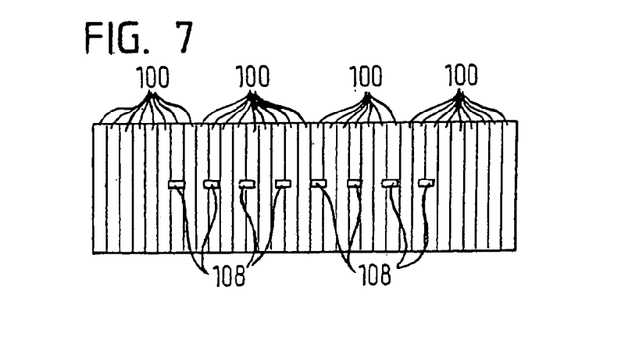
FIG. 7 is a schematic representation of photo-detection elements in a light receiver of the protective apparatus in FIG. 4.

The line-scan camera 94 includes a plurality of elongate photo-detection elements 100 in the CMOS or CCD technology (cf. FIG. 7) which are arranged parallel to one another transversely to their longitudinal direction and which have a length along their longitudinal axis of approximately 250 μm and a length in a direction transversely thereto of approximately 12.5 μm (cf. FIG. 7).

The line-scan camera 94 is connected to the evaluation circuit 96 which receives and monitors electrical signals emitted by the photo-detection elements 100 on the reception of light. When an interruption of a light path is detected, an alarm signal is emitted to the drive device of the bending tool 32.

A restriction device 102 held at the holder 66 at the holding arm 40 has parallel, flatly rectangular, retro-reflective elements 104 (cf. FIG. 6) which are arranged transversely to the linear track of the bending tool and thus of the direction of movement B. The short sides of the retro-reflective elements are aligned parallel to the direction of movement B. An encoding is formed by this arrangement. The retro-reflective elements 104 are formed from a conventional retro-reflective foil.

Figure 5:
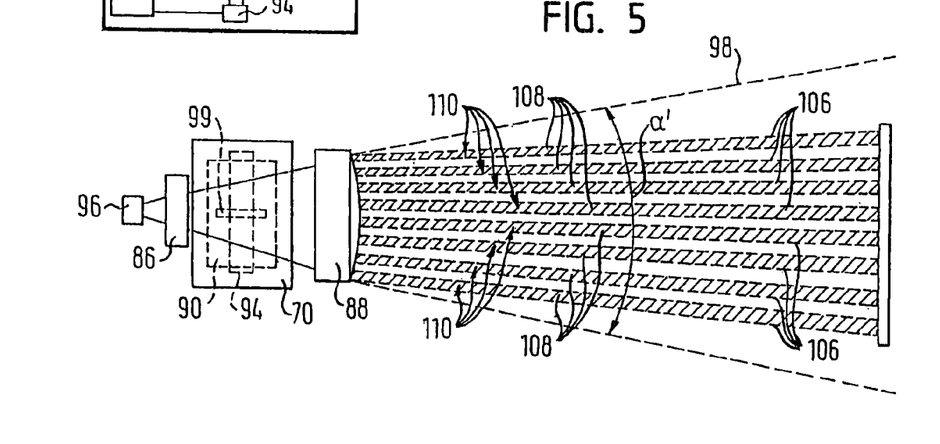
FIG. 5 is a schematic, partly plan view of the protective apparatus in FIG. 4.
Figure 6:
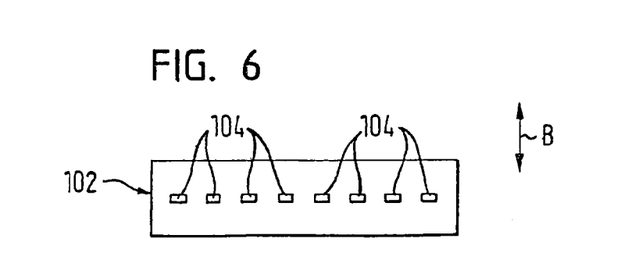
FIG. 6 is a schematic representation of a restriction device of the protective apparatus in FIG. 4.

For the monitoring, in particular during the movement of the bending tool 32, light of the laser diode 69 is beamed by the cylindrical lens 86 and by the aspheric lens 88 into the divergent transmitted light bean 98 which is less divergent in a direction parallel to the direction of movement B than in a direction perpendicular thereto (cf. FIGS. 4 and 5). The aperture angle α can amount to, for example, 1° and the aperture angle α' to, for example, approximately 0° at a spacing of the restriction device from the transmission/reception unit 84 of, for example, 2 m.

In accordance with the encoding, the retro-reflective elements 104 reflect a fan of part beams 106 into a fan of received light beams 108 which are now somewhat convergent due to the retro-reflection. The fanned part beams 106 or the received light beams 108 are only shown partly as separate beams in FIG. 5 for reasons of clarity.

Furthermore, the transmitted light beam 98 is restricted in a direction of divergence parallel to the direction of movement B by the retro-reflective elements 104 whose short sides are aligned parallel to said direction of divergence. Their extent in the direction of movement B is selected in accordance with a mean amplitude of the transmission/reception unit 84 to be expected by a factor of 10 smaller than the width of the transmitted light beam 98 at the direction of restriction 102. The part beams 106 reflected into the received light beams 108 are therefore less divergent than the transmitted light beam 98 in a direction parallel to the direction of movement. The width of the transmitted light beam 98 in the direction of divergence parallel to the direction of movement B at the restriction device 102 is thus also larger than a width of the received light beams 108 produced by the reflection directly at the restriction device 102.

The part beams 106 and, due to the retro-reflective properties of the retro-reflective elements 104 also the received light beams 108, thus define a protected zone 110 which is shown as hatched and whose position is fixed by the transmission/reception unit 84 and by the restriction device 102 and which is arranged in fan-like shape substantially areally perpendicular to the direction of movement B of the bending tool 32 parallel to its lower side at a spacing corresponding to the trailing path N.

The received light beams 108 are guided through the aspheric lens 88 via the beam splitter 70 through the slit diaphragm 90. The slit 99 of the slit diaphragm 90 is arranged parallel to a direction of divergence of the received light beams 108 at the location of the slit diaphragm which corresponds to the direction in which the transmitted light beam 98 was restricted to the received light beam 108 by the restriction device 102 in the direction of movement B. The slit 99 is thus also arranged perpendicular to the direction of movement B. The slit diaphragm 90 therefore brings about an increase in the depth of field perpendicular to the direction of movement B of the bending tool 32, but not in a direction orthogonal thereto which corresponds to the direction in which the divergent transmitted light beam 98 was restricted parallel to the direction of movement B.

After passing through the color filter 92, where outside light and interfering light is filtered, the imaging of the retro-reflective elements 104 shown only schematically in FIG. 7 appears on the line-scan camera 94 such that a spatial resolution is present in the viewfinder region perpendicular to the direction of movement B. In FIG. 7, the photo-detection elements 100 are shown too wide in comparison with the images of the retro-reflective elements 104 for reasons of clarity.

The photo-detection elements 104 are arranged with their elongate directions parallel to the slot 99 and thus to a direction of divergence of the received light bundles 108 at the location of the photo-detection elements 104 which corresponds to the direction in which the transmitted light beam 98 was restricted to the received light beam 108 by the restriction unit 102 in the direction of movement B. The effects of vibration-induced movements of the restriction device 102, and thus the received light beam 108 parallel to the direction of movement B, can thereby be easily intercepted.

Analog to the first two embodiments, by the use of the restriction device 102 with retro-reflective elements 104, a protected zone 110 which is arranged in a constant manner relative to the bending tool 32, is narrow in the direction of movement B and allows a safe monitoring of the zone beneath the bending tool 32, and thus low downtimes of the bending press, also results with vibrations of the transmission/reception unit 84 and of the restriction device 102 toward one another in the direction of movement B or on tilting movements of the transmission/reception unit 84 with respect to the restriction device 102 in a plane which contains the direction of movement B.

Figure 8:
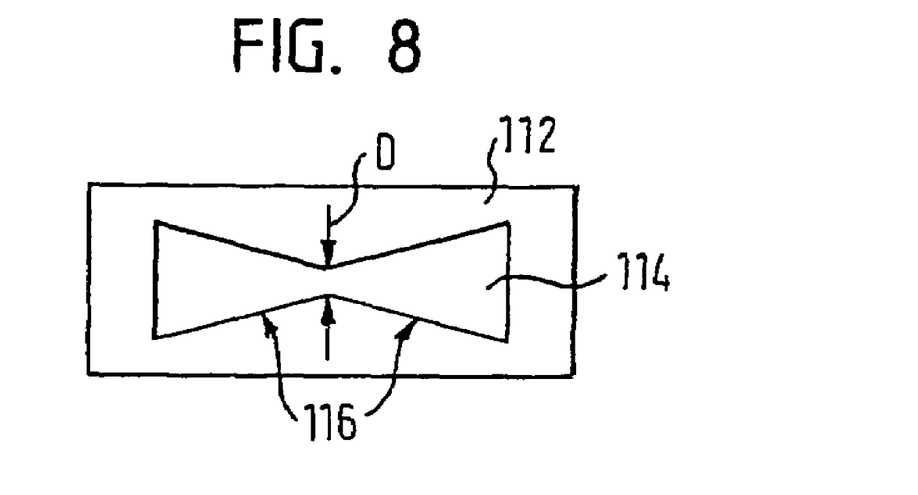
FIG. 8 is a schematic representation of a diaphragm of a protective apparatus of a bending press in accordance with a fourth preferred embodiment of the invention.
Figure 9:
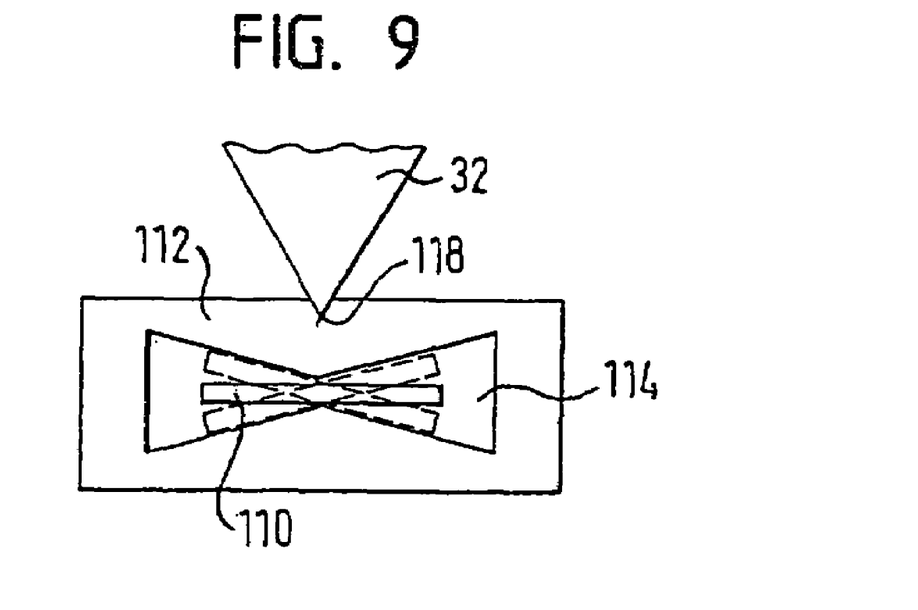
FIG. 9 is a schematic representation of a protected zone position in the protective apparatus in FIG. 8.

A bending press with a protective apparatus in accordance with a fourth preferred embodiment of the invention is shown partly in FIGS. 8 and 9. It is substantially shown like the bending press in the third embodiment such that the same reference numerals are used for the same components and the statements on these components also apply correspondingly in this embodiment.

In contrast to the bending press in the third embodiment, a diaphragm 112 is provided between the aspheric lens 88 and the beam splitter 70 and has a butterfly-like diaphragm aperture 114 (cf. FIG. 8). Two wing regions 116 of the diaphragm aperture 114 are arranged substantially parallel to the areal protected zone 110 and thus transversely to the direction of movement B or to the direction in which the divergent transmitted light beam 98 can be restricted by the restriction unit 102 (cf. FIG. 9).

A width D of a restriction of the diaphragm aperture 114 corresponds to the height of the retro-reflective elements 104 in the direction of the direction of movement B.

The diaphragm 112 is arranged at such a spacing from a lower edge 118 of the bending tool 32 that the protected zone 110 lies at the height of the restriction of the diaphragm aperture 114 and the received light beams 108 can pass through it (cf. FIG. 9).

In the event of a maladjustment between the restriction device 102 and the transmission/reception unit 84 in the direction of movement B, the light path is interrupted at the middle of the protected zone 110 since the received light beams 108 can no longer pass through the only narrow diaphragm aperture 114 in this region. Such a maladjustment in the direction of high safety relevance directly beneath the lower edge 118 of the bending tool 32 is therefore easy to recognize.

A maladjustment in the angular position of the diaphragm 112 or of the transmission/reception unit 84 with respect to the restriction unit 102, and thus to the protected zone 110, for example by assembly imprecision or by vibrations, does not, in contrast, necessarily result in an interruption of the light path. This is illustrated in FIG. 9 in which the diaphragm 112 is only shown schematically while omitting the aspheric lens 88. The wing regions 114 are made such that the received light beams 108 can still pass through the diaphragm 112 in the event of maladjustments by angles of up to approximately 3° and no interruption of the light path takes place. Since the marginal region of the protected zone 110 has the function of recognizing an intervention approaching from the side, the different spacings of the protected zone 110 from the bending tool 32 in this region are of lesser importance.

Tiltings between the transmission/reception unit 84 and the restriction device along the lower edge 118 of the bending tool 32 caused by vibrations do not have a negative effect since the retro-reflective elements 104 substantially reflect the transmitted light beam 98 or the part beams 106 onto themselves. Furthermore, for example, retro-reflective foils have a certain scattered portion on reflection by which such maladjustments are likewise partly compensated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A protective apparatus for securing to a component movable along a track (B) and for the monitoring of a protected zone to be moved with the component, the protective apparatus comprising
   a light transmitter for the radiation of a divergent transmitted light beam into a spatial zone containing the protected zone;
   a light receiver for the reception of at least some of the light of the transmitted light beam of the light transmitter radiated into the spatial zone and for the emitting of corresponding reception signals;
   a restriction device which is arranged in the direction of a transmitted light path after a section of the transmitted light path which contains the protected zone and by means of which the transmitted light beam can be restricted to a less divergent received light beam determining the width of the protected zone in at least one direction; and
   wherein an aperture angle of the transmitted light beam is selected such that a width of the transmitted light beam directly at the restriction device is larger in a pre-determined direction orthogonal to the transmitted light path directly in front of the restriction device than a mean amplitude of movement of the transmitted light beam to be expected directly at the restriction device and caused by a relative movement of the light transmitter and the restriction device.

2. A protective apparatus in accordance with claim 1, characterized in that an aperture angle of the transmitted light beam is selected such that a width of the transmitted light beam is larger by a factor of 10 in a pre-determined direction orthogonal to the transmitted light path directly in front of the restriction device than a corresponding width of the received light beam directly at the restriction device.

3. A protective apparatus in accordance with claim 1, characterized in that the restriction device includes a diaphragm.

4. A protective apparatus in accordance with claim 1, characterized in that the restriction device includes a reflecting element at which a part beam of the divergent transmitted light beam to be supplied to the light receiver can be reflected.

5. A protective apparatus in accordance with claim 4, characterized in that the light transmitter and the light receiver are arranged on the same side of the protected zone.

6. A protective apparatus in accordance with claim 4, characterized in that the light transmitter and the light receiver preferably have a common beam splitter and at least one common transmission/reception lens arranged after the beam splitter in the transmission direction.

7. A protective apparatus in accordance with claim 4, characterized in that the restriction device includes at least two reflecting or retro-reflective elements which represent an encoding.

8. A protective apparatus in accordance with claim 1, characterized in that the restriction device includes a retro-reflective element at which a part beam of the divergent transmitted light beam to be supplied to the light receiver can be reflected.

9. A protective apparatus in accordance with claim 8, characterized in that the light transmitter and the light receiver are arranged on the same side of the protected zone.

10. A protective apparatus in accordance with claim 1, characterized in that the light receiver has at least one reception element whose reception area in a direction of divergence of the received light beam, which corresponds to the direction (B) in which the divergent transmitted light beam was restricted by the restriction device, has a larger extent than in a direction orthogonal thereto.

11. A protective apparatus in accordance with claim 1, characterized in that the light receiver has a slit diaphragm whose slit is arranged parallel to a direction of divergence of the received light beam which corresponds to the direction in which the divergent transmitted light beam can be restricted by the restriction device.

12. A protective apparatus in accordance with claim 1, characterized in that the light transmitted is made such that a transmitted light beam can be emitted by it which diverges differently in two directions orthogonal to one another.

13. A protective apparatus in accordance with claim 12, characterized in that the light transmitter and the restriction device are preferably made for the monitoring of a protected zone which is areal in a direction orthogonal to a direction of movement of the component.

14. A protective apparatus in accordance with claim 1, characterized in that the light receiver has a diaphragm with a butterfly-like diaphragm aperture which includes two wing regions which are arranged transversely to the direction (B) in which the divergent transmitted light beam can be restricted by the restriction device.

15. A protective apparatus in accordance with claim 1, characterized in that the light receiver has a linear arrangement of photo-detection elements.

16. A protective apparatus in accordance with claim 1, characterized by an evaluation circuit for the reception of received signals of the light receiver and for the emitting of corresponding monitoring signals.

17. An apparatus, comprising:
    a component which can be moved on a pre-determined track (B) by a drive device; and a protective apparatus being secured to the component and for monitoring a protected zone to be moved with the component, the protective apparatus comprising:

a light transmitter for the radiation of a divergent transmitted light beam into a spatial zone containing the protected zone;

a light receiver for the reception of at least some of the light of the transmitted light beam of the light transmitter radiated into the spatial zone and for the emitting of corresponding reception signals;

a restriction device which is arranged in the direction of a transmitted light path after a section of the transmitted light path which contains the protected zone and by means of which the transmitted light beam can be restricted to a less divergent received light beam determining the width of the protected zone in at least one direction, wherein the protected zone includes at least a portion of the track (B); and wherein an aperture angle of the transmitted light beam is selected such that a width of the transmitted light beam directly at the restriction device is larger in a predetermined direction orthogonal to the transmitted light oath directly in front of the restriction device than a mean amplitude of movement of the transmitted light beam to be expected directly at the restriction device and caused by a relative movement of the light transmitter and the restriction device.

18. An apparatus in accordance with claim 17, characterized in that the light transmitter and the restriction device are held at the component at two holding arms spaced apart spatially transversely to the track (B) of the component.

19. An apparatus in accordance with claim 17, wherein the apparatus includes a shaping apparatus, in particular a bending press.

20. An apparatus in accordance with claim 17, wherein the component includes a shaping tool, in particular a bending tool.

21. A method for the monitoring of a protected zone which has to be moved along with a component moved along a track (B), in which a divergent transmitted light beam is transmitted and moved along with the component;

the divergent transmitted light beam is restricted, after covering a light path including the protected zone, to a less divergent received light beam moved along with the component and defining the width of the protected zone in at least one direction;

the received light beam is received and monitored; and wherein an aperture angle of the transmitted light beam is selected such that a width of the transmitted light beam directly at the restriction device is larger in a predetermined direction orthogonal to the transmitted light path directly in front of the restriction device than a mean amplitude of movement of the transmitted light beam to be expected directly at the restriction device and caused by a relative movement of the light transmitter and the restriction device.

22. A method in accordance with claim 21, characterized in that a reflecting element is used for the restriction of the transmitted light beam.

23. A method in accordance with claim 21, characterized in that a retro-reflective element is used for the restriction of the transmitted light beam.

* * * * *